US010715723B2

United States Patent
Okazawa

(10) Patent No.: US 10,715,723 B2
(45) Date of Patent: Jul. 14, 2020

(54) IMAGE PROCESSING APPARATUS, IMAGE ACQUISITION SYSTEM, IMAGE PROCESSING METHOD, AND IMAGE PROCESSING PROGRAM

(71) Applicant: OLYMPUS CORPORATION, Hachioji-shi, Tokyo (JP)

(72) Inventor: Atsuro Okazawa, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/298,227

(22) Filed: Mar. 11, 2019

(65) Prior Publication Data
US 2019/0208122 A1  Jul. 4, 2019

Related U.S. Application Data

(63) Continuation of application No. PCT/JP2016/079257, filed on Oct. 3, 2016.

(51) Int. Cl.
*H04N 5/232* (2006.01)
*H04N 5/265* (2006.01)
(Continued)

(52) U.S. Cl.
CPC ........... *H04N 5/23232* (2013.01); *G06T 7/30* (2017.01); *H04N 1/387* (2013.01); *H04N 5/217* (2013.01);
(Continued)

(58) Field of Classification Search
CPC .. H04N 5/23232; H04N 5/217; H04N 5/2355; H04N 1/387; H04N 5/265; H04N 5/23222; G06T 7/30
See application file for complete search history.

(56) References Cited

U.S. PATENT DOCUMENTS 5,444,478 A *  8/1995  Lelong .................... H04N 7/181
                                                 348/39
8,180,100 B2 *  5/2012  Fujimaki ................. G06T 7/593
                                                 382/100
(Continued)

FOREIGN PATENT DOCUMENTS

JP         2009207034 A    9/2009
JP         2010021698 A    1/2010
(Continued)

OTHER PUBLICATIONS

International Search Report (ISR) (and English language translation thereof) dated Dec. 6, 2016 issued in counterpart International Application No. PCT/JP2016/079257.
(Continued)

*Primary Examiner* — Timothy J Henn
(74) *Attorney, Agent, or Firm* — Holtz, Holtz & Volek PC

(57) ABSTRACT

An image processing apparatus includes at least one processor configured to execute processes including: calculating a misalignment amount of each pixel of a reference image relative to a standard image; and combining the reference image converted based on the calculated amount with the standard image. The calculating includes: calculating a projection conversion matrix for each of planes with different misalignment amounts in the reference image; generating a plane map in which the plane to which each pixel of the reference image belongs and the matrix to be applied to each plane are selected based on a difference value between the standard image and each of the alignment images converted from the reference image by using each calculated matrix; suppressing a selection error of the matrix; and calculating the misalignment amount for each of the planes based on the plane map in which the selection error of the matrix is suppressed.

9 Claims, 14 Drawing Sheets

(51) Int. Cl.
*H04N 5/217* (2011.01)
*H04N 5/235* (2006.01)
*H04N 1/387* (2006.01)
*G06T 7/30* (2017.01)

(52) U.S. Cl.
CPC ....... *H04N 5/2355* (2013.01); *H04N 5/23222* (2013.01); *H04N 5/265* (2013.01)

(56) References Cited

U.S. PATENT DOCUMENTS

| | | |
|---|---|---|
| 2009/0219415 A1 | 9/2009 | Matsunaga et al. |
| 2010/0007761 A1 | 1/2010 | Matsunaga et al. |
| 2010/0167160 A1 | 7/2010 | Takane et al. |
| 2010/0290714 A1 | 11/2010 | Toyoda et al. |
| 2012/0275711 A1* | 11/2012 | Inaba .................. G06K 9/4623 382/201 |
| 2018/0075602 A1* | 3/2018 | Shen ......................... G06T 7/50 |
| 2018/0316865 A1* | 11/2018 | Wakamatsu ....... H04N 5/23287 |
| 2019/0132528 A1* | 5/2019 | Nashizawa ............ H04N 5/232 |

FOREIGN PATENT DOCUMENTS

| | | |
|---|---|---|
| JP | 2011022805 A | 2/2011 |
| JP | 2013072813 A | 4/2013 |
| JP | 5499261 B2 | 3/2014 |
| JP | 2015224909 A | 12/2015 |
| WO | 2009107197 A1 | 9/2009 |

OTHER PUBLICATIONS

Shimamura, "Multiple-Plane Detection based on Nomography and Projected Line Detection for Use in a Projector-Camera System", The Journal of the Institute of Image Information and Television Engineers, Jan. 1, 2007, vol. 61, No. 1, pp. 76-84.

\* cited by examiner

FIG. 11
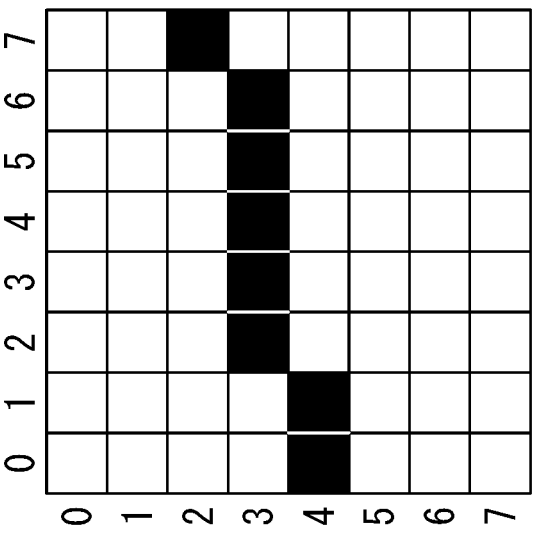
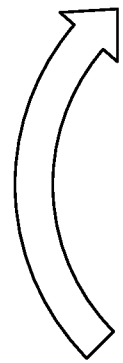
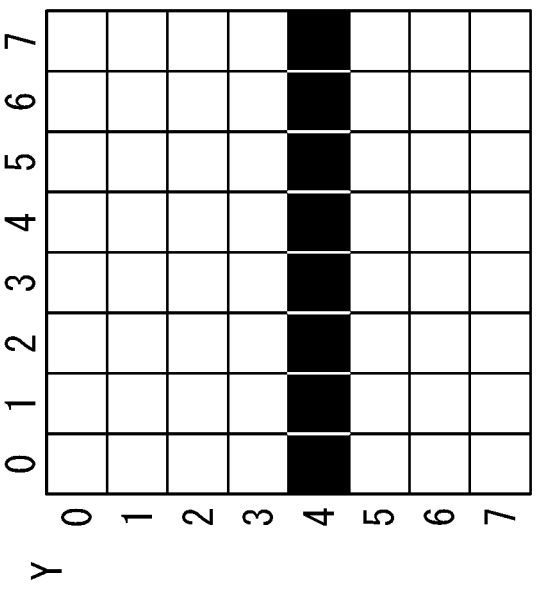

FIG. 12
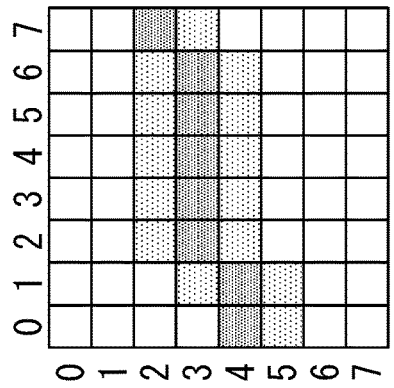
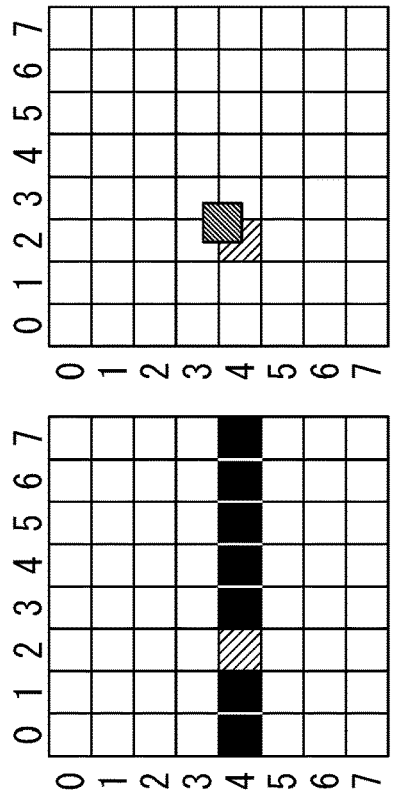

IMAGE PROCESSING APPARATUS, IMAGE ACQUISITION SYSTEM, IMAGE PROCESSING METHOD, AND IMAGE PROCESSING PROGRAM

CROSS-REFERENCE TO RELATED APPLICATIONS

This is a continuation of International Application PCT/JP2016/079257 which is hereby incorporated by reference herein in its entirety.

TECHNICAL FIELD

The present invention relates to image processing apparatuses, image acquisition systems, image processing methods, and image processing programs.

BACKGROUND ART

One of known techniques in the related art for aligning a plurality of images involves modeling the misalignment amount of each pixel position by using a projection conversion matrix. This technique includes determining the misalignment amounts of characteristic regions of images by performing optical flow or feature-point matching on a standard image and a reference image that are arbitrarily selected from among a plurality of acquired images, and subsequently determining the misalignment amounts of the pixel positions by estimating geometric changes in the entire screen from information about the misalignment amounts.

When determining the misalignment amount of each pixel position by using a projection conversion matrix, it is possible to properly calculate in which direction and how much the entire image has moved if an object having depth is not included. However, if an object having depth is included, such as when there is a mixture of a plurality of planes, the misalignment amounts vary greatly among different planes. Thus, it is necessary to take into account misalignment amounts that vary from region to region. If an appropriate misalignment amount cannot be applied to an appropriate region, it is not possible to perform the alignment properly, thus causing an artifact (data error) to occur in the combined image.

A known image processing apparatus disclosed in Patent Literature 1 generates a combined image while solving the aforementioned problem. In order to suppress an artifact, the image processing apparatus disclosed in Patent Literature 1 first determines a plurality of projection conversion matrices that express misalignment amounts. In a subject having a mixture of a plurality of planes, a projection conversion matrix indicates an optimal projection conversion matrix for any one of the planes. While switching between the projection conversion matrices, a plurality of images to which misalignment amounts are applied (referred to as "alignment images" hereinafter) are generated, and a difference value between each of these alignment images and the standard image is determined. A region with a large difference value is determined as being another planar region with a different misalignment amount, and a projection conversion matrix used when generating an alignment image with the smallest difference value is selected as a projection conversion matrix to be applied to that pixel. Then, by using a selection result (plane map) of all the pixels, appropriate misalignment amounts are applied to appropriate regions, thereby suppressing artifacts in the combined image.

CITATION LIST

Patent Literature

{PTL 1}
The Publication of Japanese Patent No. 5499261

SUMMARY OF INVENTION

One aspect of the present invention provides an image processing apparatus including: at least one processor, the processor being configured to execute processes including: a misalignment amount calculating process that calculates a misalignment amount of each pixel of at least one reference image other than a standard image, serving as a standard in a plurality of images obtained by photographing a subject, relative to each pixel of the standard image by using a projection conversion matrix; and an image combining process that generates a combined image by combining the reference image converted based on the misalignment amount calculated by the misalignment amount calculating process with the standard image. The misalignment amount calculating process includes: a multi-planar projection-conversion-matrix calculating process that calculates the projection conversion matrix for each of planes with different misalignment amounts in the reference image; a plane selecting process that generates a plurality of alignment images converted from the reference image by using the projection conversion matrices calculated for the respective planes and generates a plane map in which the plane to which each pixel of the reference image belongs and the projection conversion matrix to be applied to each plane are selected based on a difference value between each of the alignment images and the standard image; a selection-error reduction process that suppresses a selection error of the projection conversion matrix in the plane map; and an arithmetic process that calculates the misalignment amount for each of the planes based on the plane map in which the selection error of the projection conversion matrix is suppressed. The selection-error reduction process includes a conversion-error reduction process that suppresses a selection error of the projection conversion matrix caused by geometric conversion using the projection conversion matrix when the selecting process generates each alignment image. The conversion-error reduction process performs a contraction process after performing an expansion process on the plane map.

Another aspect of the present invention provides an image processing method including: calculating a misalignment amount of each pixel of at least one reference image other than a standard image, serving as a standard in a plurality of images obtained by photographing a subject, relative to each pixel of the standard image by using a projection conversion matrix; and generating a combined image by combining the reference image converted based on the misalignment amount calculated in the calculating of the misalignment amount with the standard image. The calculating of the misalignment amount includes: calculating the projection conversion matrix for each of planes with different misalignment amounts in the reference image; generating a plurality of alignment images converted from the reference image by using the projection conversion matrices calculated for the respective planes and generating a plane map in which the plane to which each pixel of the reference image belongs and the projection conversion matrix to be applied to each plane are selected based on a difference value between each of the alignment images and the standard image; suppressing a selection error of the projection conversion matrix in the plane map; and calculating the misalignment amount for each of the planes based on the plane map in which the selection error of the projection conversion matrix is suppressed. The suppressing of the selection error of the projection conversion matrix includes suppressing a selection error of the projection conversion matrix caused by geometric conversion using the projection conversion matrix when generating each alignment image. The suppressing of selection error of the projection conversion matrix caused by geometric conversion using the projection conversion matrix performs a contraction process after performing an expansion process on the plane map.

Another aspect of the present invention provides a non-transitory computer-readable medium having an image processing program stored therein, the image processing program causing a computer to execute functions of: calculating a misalignment amount of each pixel of a reference image other than a standard image, serving as a standard in a plurality of images obtained by photographing a subject, relative to each pixel of the standard image by using a projection conversion matrix; and generating a combined image by combining the reference image converted based on the misalignment amount calculated in the calculating of the misalignment amount with the standard image. The calculating of the misalignment amount includes: calculating the projection conversion matrix for each of planes with different misalignment amounts in the reference image; generating a plurality of alignment images converted from the reference image by using the projection conversion matrices calculated for the respective planes and generating a plane map in which the plane to which each pixel of the reference image belongs and the projection conversion matrix to be applied to each plane are selected based on a difference value between each of the alignment images and the standard image; suppressing a selection error of the projection conversion matrix in the plane map; and calculating the misalignment amount for each of the planes based on the plane map in which the selection error of the projection conversion matrix is suppressed. The suppressing of the selection error of the projection conversion matrix includes suppressing a selection error of the projection conversion matrix caused by geometric conversion using the projection conversion matrix when generating each alignment image. The suppressing of selection error of the projection conversion matrix caused by geometric conversion using the projection conversion matrix performs a contraction process after performing an expansion process on the plane map.

BRIEF DESCRIPTION OF DRAWINGS

FIG. 11 illustrates an example of image data sampled in a case where the camera is rotated by 20° between a standard image and a reference image.

FIG. 12 illustrates an example of image data obtained when geometric conversion is digitally performed on a reference image using a projection conversion matrix.

DESCRIPTION OF EMBODIMENTS

An image processing apparatus, an image acquisition system, an image processing method, and an image processing program according to an embodiment of the present invention will be described below with reference to the drawings.

Figure 1:
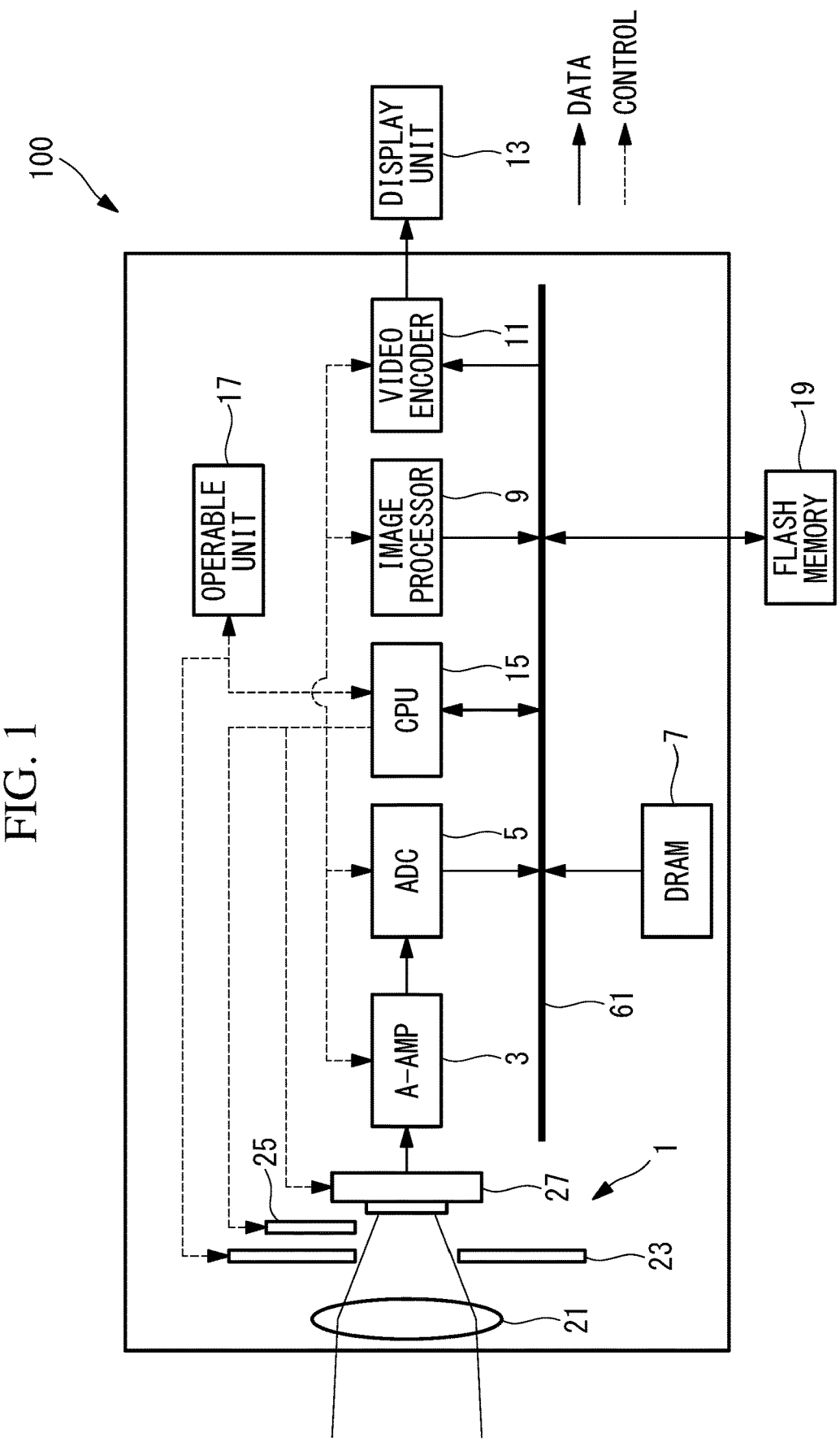
FIG. 1 is a block diagram schematically illustrating a configuration example of an image acquisition system according to an embodiment of the present invention.

An image acquisition system 100 according to this embodiment is, for example, a digital camera. As shown in FIG. 1, the image acquisition system 100 includes an image acquisition unit 1 that acquires a plurality of images of a subject (not shown), an A-AMP (analog amplifier) 3, an ADC (analog-to-digital converter) 5, a DRAM (dynamic random access memory) 7, an image processor (image processing apparatus) 9, a video encoder 11, a display unit 13, a CPU 15, an operable unit 17, and a flash memory 19.

The image acquisition unit 1 includes a photographic lens 21 that focuses light from the subject, an aperture stop 23 that limits the amount of luminous flux focused by the photographic lens 21, a mechanical shutter 25 capable of blocking light passing through the aperture stop 23, and an image acquisition element 27 that acquires an image of the light passing through the mechanical shutter 25.

The photographic lens 21 is an optical system constituted by a single lens or a plurality of lenses for forming an image of the subject in the image acquisition element 27. The photographic lens 21 may be a single focus lens or a zoom lens.

The aperture stop 23 is disposed in the optical axis of the photographic lens 21 and the aperture thereof is changeable.

The mechanical shutter 25 is disposed behind the aperture stop 23 and is openable and closable. By adjusting the opening time of the mechanical shutter 25, the incident time in which a light beam from the subject enters the image acquisition element 27 can be adjusted. In other words, the mechanical shutter 25 can adjust the exposure time of the image acquisition element 27. The mechanical shutter 25 used may be a known focal plane shutter or a lens shutter.

The image acquisition element 27 is disposed at a position behind the mechanical shutter 25 in the optical axis of the photographic lens 21 and where the light beam from the subject is focused by the photographic lens 21. The image acquisition element 27 is constituted of two-dimensionally-arranged photodiodes (not shown) constituting pixels.

The photodiodes constituting the image acquisition element 27 generate electric charge according to the amount of light received. The electric charge generated in each photodiode is accumulated in a capacitor connected to each photodiode. The electric charge accumulated in each capacitor is read as an image signal in accordance with a control signal from the CPU 15.

For example, a Bayer-array color filter (not shown) is disposed in front of the photodiodes constituting the pixels. A Bayer array has lines in which R pixels and G (Gr) pixels are alternately arranged in the horizontal direction and lines in which G (Gb) pixels and B pixels are alternately arranged in the horizontal direction.

The A-AMP 3 performs an analog gain adjustment on an image signal transmitted from the image acquisition element 27.

The ADC 5 is an analog-to-digital converter and converts the image signal having undergone the analog gain adjustment performed by the A-AMP 3 into a digital image signal (pixel data). In the following description, a group of a plurality of pieces of pixel data will be referred to as "image acquisition data". A value related to each pixel indicated by pixel data will be referred to as "pixel value". The image acquisition data created by the ADC 5 is written into the DRAM 7.

The DRAM 7 is an electrically rewritable memory and is capable of temporarily storing various types of data, such as image acquisition data (pixel data), recording image data, display image data, and processing data in the CPU 15. For temporarily storing data, the DRAM 7 may be replaced with an SDRAM (synchronous dynamic random access memory).

The image processor 9 is constituted by, for example, an ASIC (application specific integrated circuit). The image processor 9 reads image data from the DRAM 7, performs image processing on the image data, and rewrites the image data as display image data or recording image data onto the DRAM 7.

For example, when a still image is to be recorded, the image processor 9 generates still-image data by performing image processing for still-image recording. When a moving image is to be recorded, the image processor 9 generates moving-image data by performing image processing for moving-image recording. Moreover, in the case of live view display, the image processor 9 generates display image data by performing image processing for displaying.

Figure 2:
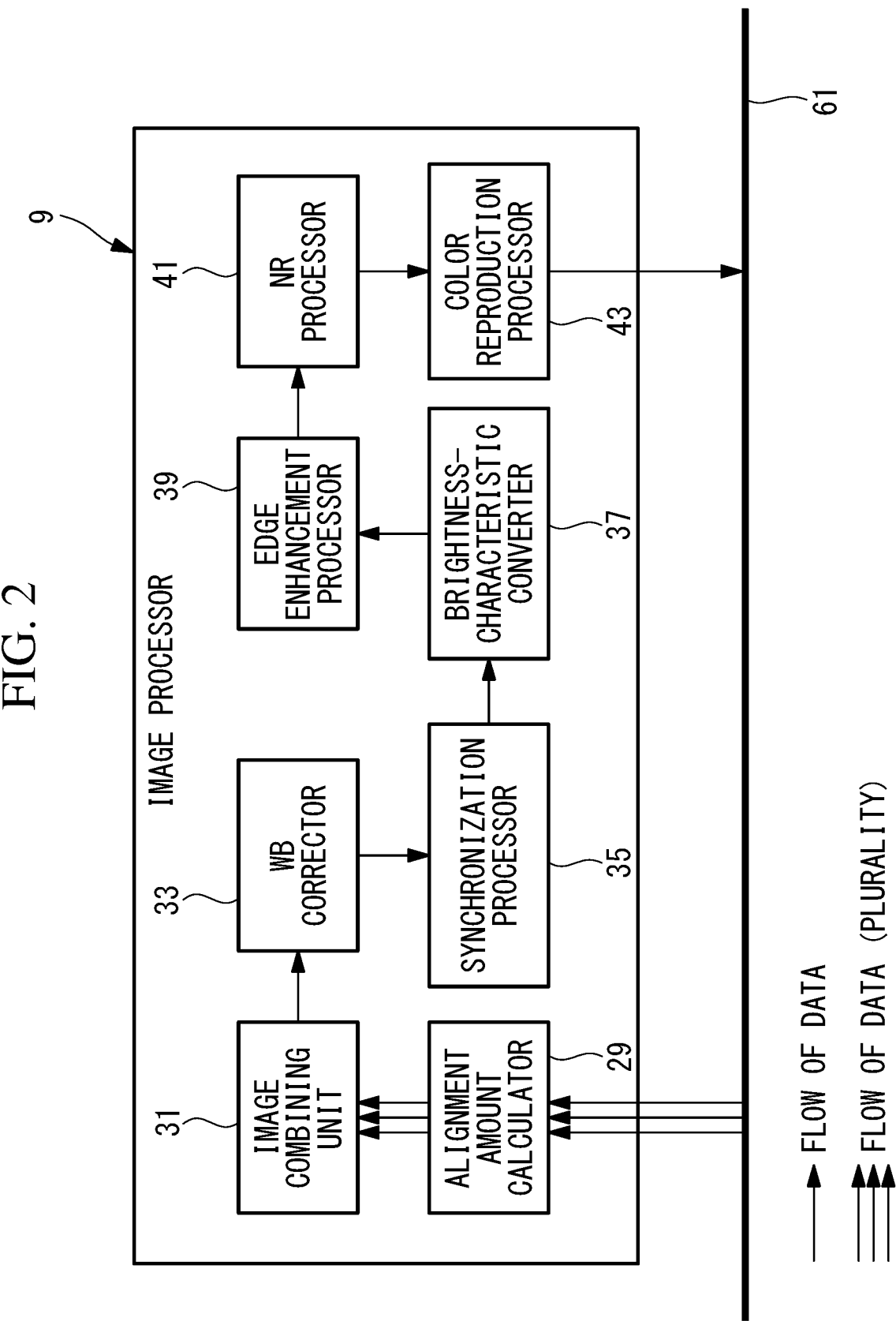
FIG. 2 is a block diagram schematically illustrating a configuration example of an image processor in FIG. 1.

As shown in FIG. 2, the image processor 9 includes an alignment amount calculator (misalignment amount calculator) 29, an image combining unit 31, a white-balance (WB) corrector 33, a synchronization processor 35, a brightness-characteristic converter 37, an edge enhancement processor 39, a noise-reduction (NR) processor 41, and a color reproduction processor 43.

The various types of components constituting the image processor 9 are not limited to the components mentioned above, and include other components. An example of another component in the image processor 9 is a compression-expansion processor. However, since components other than the components mentioned above are not directly relevant to the present invention, such components are not shown in the drawings and descriptions thereof are omitted.

The alignment amount calculator 29 reads, from the DRAM 7, a standard image serving as a standard among the plurality of images acquired by the image acquisition unit 1 and at least one reference image other than the standard image, and calculates a misalignment amount of each pixel of the reference image relative to each pixel of the read standard image.

The alignment amount calculator 29 will be further described with reference to FIG. 3. The alignment amount calculator 29 includes a multi-planar projection-conversion-matrix calculator 45, a plane selector 47, a selection-error reduction processor 49, and an arithmetic processor 51.

The multi-planar projection-conversion-matrix calculator 45 calculates a projection conversion matrix for each of planes with different misalignment amounts in the reference image. Specifically, the multi-planar projection-conversion-matrix calculator 45 extracts feature points of an image, performs grouping of feature points assumed to be in the same plane, and determines a projection conversion matrix by using information about the grouped feature points. Projection conversion matrices are calculated for the number of groups.

Figure 4:
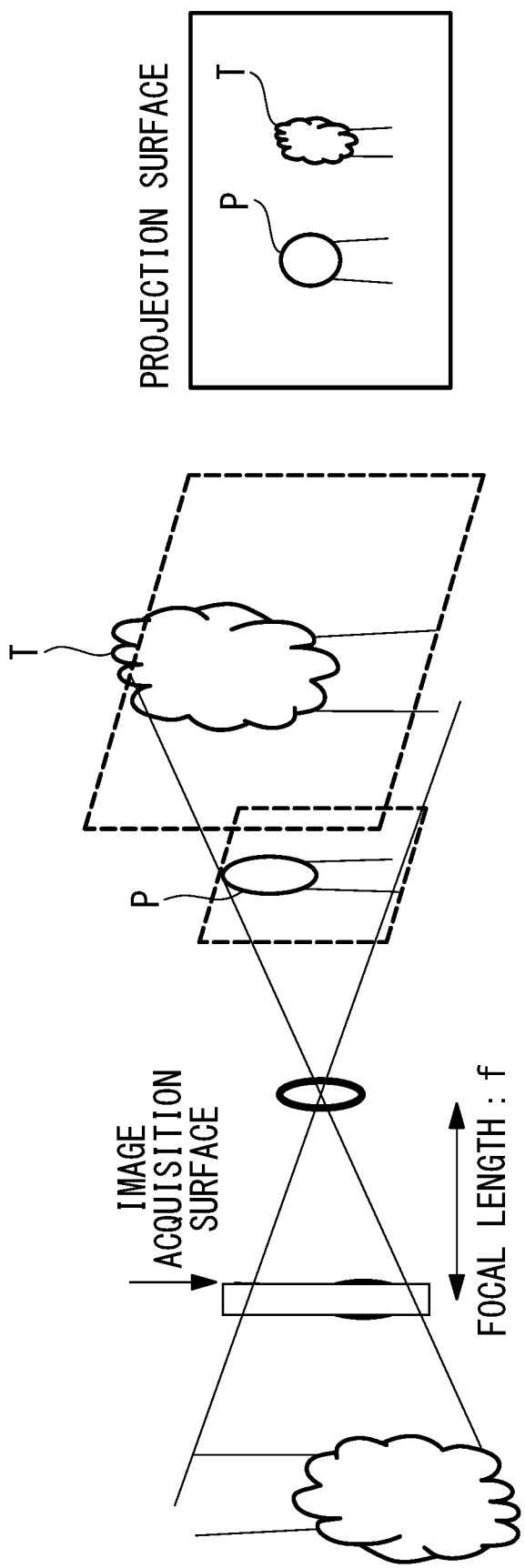
FIG. 4 illustrates an example of a projection image obtained by photographing two subjects with different distances in the depth direction.

As shown in FIG. 4, it is assumed that subjects exist in two planes in the depth direction. A subject (tree) T in the rear is larger than a subject (person) P in the real world. However, the subject T in the rear is small in the acquired projection image since the subject distance thereof is larger than that of the subject P in the front. Therefore, even if the subject T in the rear is much larger than the subject P in the front in the real world, the subject T in the rear and the subject P in the front may possibly appear to have similar sizes in the projection image.

Figure 5:
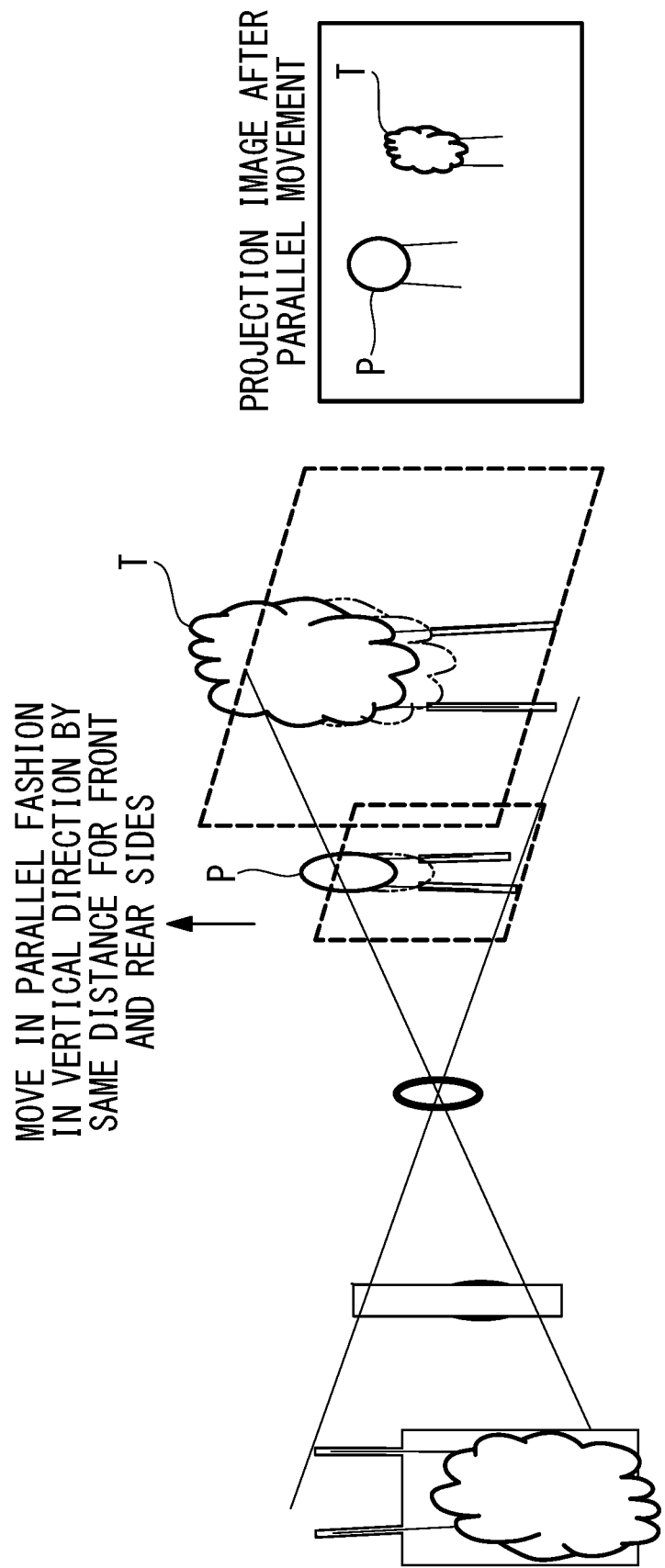
FIG. 5 illustrates an example of a projection image obtained by photographing the subjects in FIG. 4 in a case where a camera is moved in a parallel fashion.

In this state, for example, as shown in FIG. 5, if the camera is moved in a parallel fashion, the subject P in the front with the smaller subject distance moves by a large amount in the projection image, whereas the subject T in the rear with the larger subject distance moves by a small amount. Therefore, a difference in misalignment amount occurs in accordance with the image regions of the subjects P and T with different subject distances. Since there are a plurality of misalignment amounts within an image, a plurality of projection conversion matrices are necessary for proper alignment.

The plane selector 47 determines which one of the plurality of projection conversion matrices calculated by the multi-planar projection-conversion-matrix calculator 45 is to be used for calculating a misalignment amount for each pixel position. Specifically, the plane selector 47 first generates a plurality of alignment images converted from the reference image by using all projection conversion matrices calculated for the respective planes. Then, the plane selector 47 calculates a difference value between each generated alignment image and the standard image for each pixel, selects the projection conversion matrix used when the alignment image with the smallest difference value is generated for each pixel, and generates a plane map in which the plane to which each pixel of the reference image belongs and the projection conversion matrix to be applied to each plane are selected.

Figure 3:
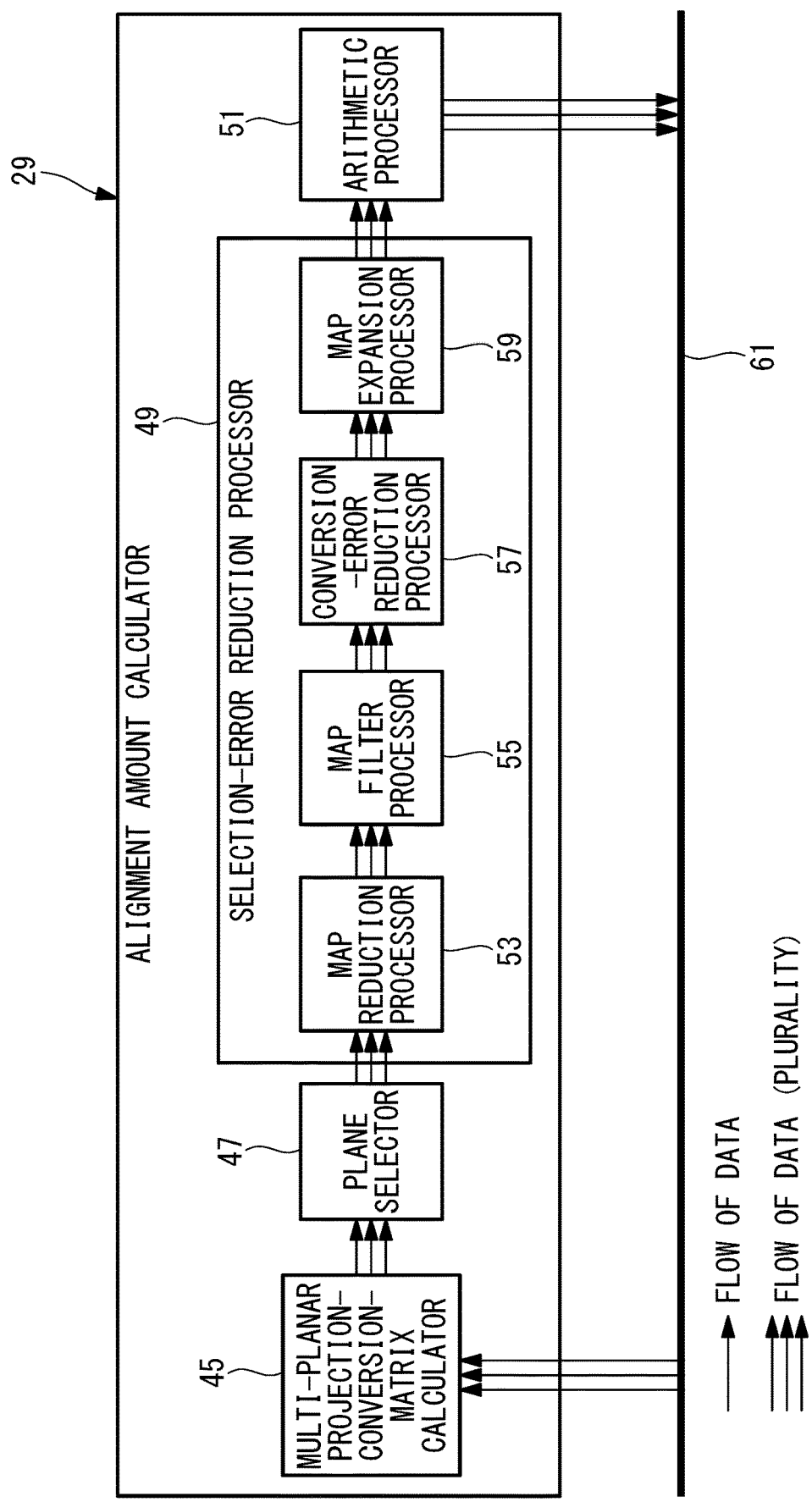
FIG. 3 is a block diagram schematically illustrating a configuration example of an alignment amount calculator in FIG. 2.

As shown in FIG. 3, the selection-error reduction processor 49 includes a map reduction processor 53, a map filter processor 55, a conversion-error reduction processor 57, and a map expansion processor 59, and suppresses a selection error of a projection conversion matrix in the plane map.

The map reduction processor 53 reduces the plane map generated by the plane selector 47, that is, information about the planes to which the pixel positions belong and the projection conversion matrices to be applied. By reducing the plane map, the amount of calculation in a subsequent filtering process can be reduced.

The map filter processor 55 suppresses a selection error of a plane map caused by noise in an image. When a difference between an alignment image and the standard image increases or decreases due to the effect of noise, an error may occur in the selection of a projection conversion matrix to be applied. The map filter processor 55 suppresses a selection error of a projection conversion matrix caused by noise, so as to reduce the effect of noise.

The conversion-error reduction processor 57 suppresses a plane selection error caused by geometric conversion during generating of an alignment image. In an alignment image, a design change may sometimes occur in a high-frequency component (such as an edge) due to geometric conversion using a projection conversion matrix. This may cause the difference value between the alignment image in which the design change has occurred and the standard image to increase, resulting in a selection error of a projection conversion matrix to be applied. The conversion-error reduction processor 57 suppresses a projection-conversion-matrix selection error caused by geometric conversion using a projection conversion matrix, so that the effect of a change in a high-frequency component caused by geometric conversion can be reduced.

The map expansion processor 59 expands the plane map reduced by the map reduction processor 53 such that the resolution thereof is the same as that before the reduction.

Based on the plane map in which the projection-conversion-matrix selection error has been suppressed by the selection-error reduction processor 49, the arithmetic processor 51 performs an arithmetic process for a misalignment amount for each plane. For example, the arithmetic processor 51 first uses the plane map and the projection conversion matrix to determine the coordinates of the reference image on the standard image.

It is assumed that the coordinates of the reference image are x, y, the coordinates to be determined on the standard image are x', y', and a plane selection result of a pixel position is P(x, y).

In a case where P(x, y) is plane A, the coordinates x', y' on the standard image are determined from expression (1).

$$\begin{pmatrix} x' \\ y' \\ 1 \end{pmatrix} = \begin{pmatrix} H1 & H2 & H3 \\ H4 & H5 & H8 \\ H7 & H6 & 1 \end{pmatrix} \begin{pmatrix} x \\ y \\ 1 \end{pmatrix} \quad (1)$$

where $$\begin{pmatrix} H1 & H2 & H3 \\ H4 & H5 & H8 \\ H7 & H6 & 1 \end{pmatrix}$$

denotes a projection conversion matrix of plane A.

In a case where P(x, y) is plane B, the coordinates x', y' on the standard image are determined from expression (2).

$$\begin{pmatrix} x' \\ y' \\ 1 \end{pmatrix} = \begin{pmatrix} G1 & G2 & G3 \\ G4 & G5 & G8 \\ G7 & G6 & 1 \end{pmatrix} \begin{pmatrix} x \\ y \\ 1 \end{pmatrix} \quad (2)$$

where $$\begin{pmatrix} G1 & G2 & G3 \\ G4 & G5 & G8 \\ G7 & G6 & 1 \end{pmatrix}$$

denotes a projection conversion matrix of plane B.

Then, the arithmetic processor 51 calculates misalignment amounts in accordance with expressions (3) and (4).

$$dif\_x = x - x' \quad (3)$$

$$dif\_y = y - y' \quad (4)$$

where dif_x and dif_y denote misalignment amounts when the coordinates of the reference image are to be aligned with the coordinates of the standard image.

Referring back to FIG. 2, based on the misalignment amounts calculated by the arithmetic processor 51, the image combining unit 31 performs, for example, geometric conversion on the reference image and combines the converted reference image with the standard image, thereby generating a combined image.

The combining process may involve, for example, simply adding and averaging out the pixel values at the same coordinates between the alignment image and the standard image, but is not limited to this method. There are various conceivable purposes for the combining process, such as noise reduction, HDR (high dynamic range), and super-resolution, but the purposes are not limited thereto.

The white-balance corrector 33 amplifies each color component of data of the combined image generated by the image combining unit 31 by a predetermined gain and corrects the color balance of the combined image.

The synchronization processor 35 performs conversion on, for example, the combined image generated using the image acquisition data output via the image acquisition element 27 in correspondence with the Bayer array of the color filter of the image acquisition element 27, such that image acquisition data in which one pixel corresponds to one color component is converted into image data in which one pixel corresponds to a plurality of color components.

The brightness-characteristic converter 37 performs conversion such that the brightness characteristics of the combined image generated by the synchronization processor 35 become suitable for displaying and recording.

The edge enhancement processor 39 multiplies an edge enhancement coefficient by an edge signal extracted from output data (image data) of the combined image from the brightness-characteristic converter 37 by using, for example, a bandpass filter, and adds the obtained result to the image data of the original combined image, so as to enhance the edge component in the image data of the target combined image.

The noise-reduction processor 41 uses, for example, coring to remove a noise component from the output data (image data) of the combined image from the edge enhancement processor 39.

The color reproduction processor 43 performs various types of processes for achieving appropriate color reproduction of the combined image. An example of a process to be performed by the color reproduction processor 43 is a color-matrix arithmetic process. A color-matrix arithmetic process involves multiplying the data of the combined image by, for example, a color matrix coefficient according to a white balance mode. Another example of a process to be performed by the color reproduction processor 43 is a chroma-hue correction process.

Referring back to FIG. 1, the video encoder 11 reads the display image data generated by the image processor 9 and temporarily stored in the DRAM 7, and outputs the read display image data to the display unit 13.

The display unit 13 is, for example, a liquid crystal display (LCD) or an organic EL display, and is disposed at the rear surface of a digital camera. The display unit 13 displays an image in accordance with the display image data transmitted from the video encoder 11. Furthermore, the display unit 13 can also be used for live view display or for displaying a recorded image.

The CPU 15 transmits control signals for controlling the image acquisition element 27, controlling the aperture of the aperture stop 23, controlling the opening and closing of the mechanical shutter 25, driving the image processor 9, driving the video encoder 11, and controlling the entire image acquisition system 100. Moreover, the CPU 15 determines whether an image to be acquired by the image acquisition element 27 is to serve as a standard image or a reference image.

The operable unit 17 includes various types of operable buttons, such as a power button, a release button, a playback button, and a menu button, and also includes various types of operable members, such as a touchscreen. A command input to the operable unit 17 by a user is recognized in accordance with processing performed by the CPU 15.

The flash memory 19 is contained or loadable in the image acquisition system 100 serving as a digital camera and can store recording image data as an image file of a predetermined format.

In FIG. 1, reference sign 61 denotes a bus. The bus 61 is connected to the ADC 5, the DRAM 7, the CPU 15, the image processor 9, the flash memory 19, and the video encoder 11. Various types of data generated in these units are forwarded via the bus 61.

Next, the image processing method using the image acquisition system 100 equipped with the image processor 9 according to this embodiment will be described.

Figure 6:
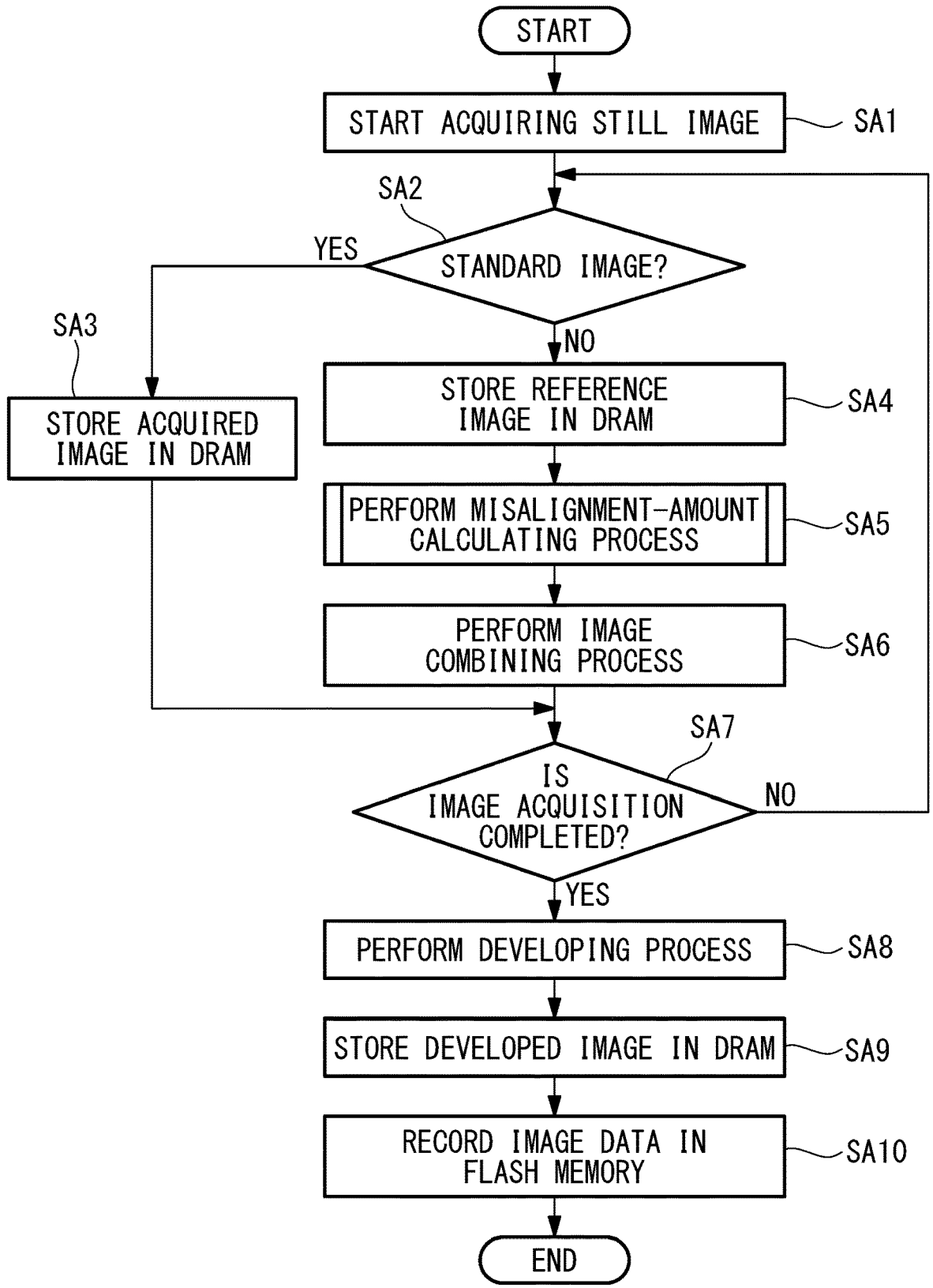
FIG. 6 is a flowchart explaining an image processing method according to an embodiment of the present invention.

As shown in a flowchart in FIG. 6, the image processing method according to this embodiment includes a misalignment-amount calculating step (step SA5) for calculating a misalignment amount of each pixel of at least one reference image relative to each pixel of a standard image obtained by photographing a subject, and an image combining step (step SA6) for generating a combined image by combining the reference image converted based on the misalignment amount calculated in the misalignment-amount calculating step (step SA5) with the standard image.

Figure 7:
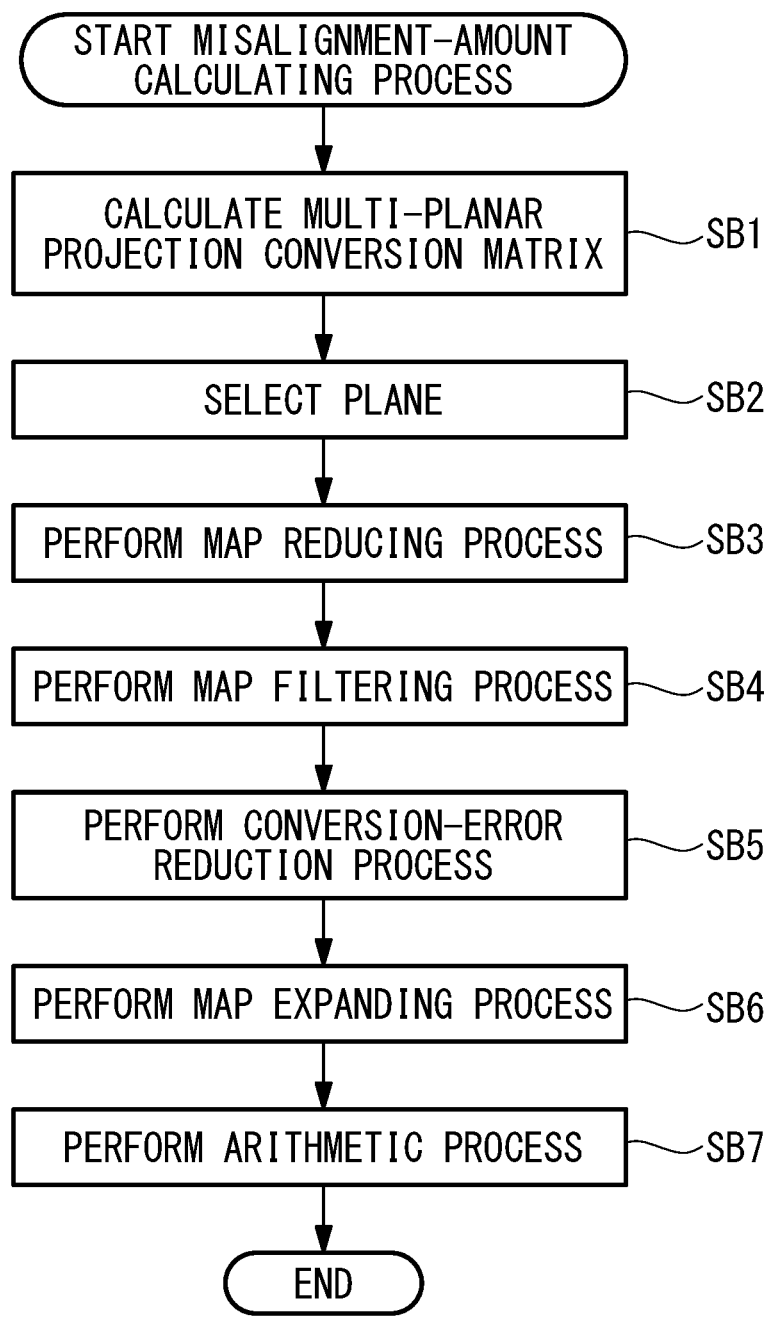
FIG. 7 is a flowchart explaining a misalignment-amount calculating step in FIG. 6.

As shown in a flowchart in FIG. 7, the misalignment-amount calculating step (step SA5) includes a multi-planar projection-conversion-matrix calculating step (step SB1) for calculating a projection conversion matrix for each of planes with different misalignment amounts in the reference image, a plane selecting step (step SB2) for generating a plurality of alignment images converted from the reference image by using each projection conversion matrix calculated for each plane in the multi-planar projection-conversion-matrix calculating step (step SB1) and generating a plane map based on a difference value between each alignment image and the standard image, a selection-error reducing step (step SB3 to step SB6) for suppressing a selection error of a projection conversion matrix in the plane map, and an arithmetic step (step SB7) for calculating an alignment amount for each plane based on the plane map in which the selection error of the projection conversion matrix has been suppressed.

Next, the operation of the image acquisition system 100 equipped with the image processor 9 having the above-described configuration and the image processing method will be described.

The flowchart in FIG. 6 illustrates an example of a still-image recording process performed by the image acquisition system 100 according to this embodiment. A still-image recording process commences when, for example, the operable unit 17 serving as a release button is pressed during live view display. Although a still-image recording process is described here, similar processing may be performed in the case of a moving-image recording process. The process described with reference to FIG. 6 is controlled by the CPU 15 and is executed by the ASIC of the image processor 9. A program related to this process may also be recorded in various types of recording media, such as an optical disk, a magnetic disk, and a semiconductor memory.

As shown in the flowchart in FIG. 6, a still image is acquired by actuating the CPU 15 (step SA1), and it is determined whether or not the currently acquired image is to serve as a standard image (step SA2). The determination of whether or not the image is to serve as a standard image is performed by, for example, determining whether or not the image is the first still image among a group of still images successively acquired in a time-series fashion.

If the currently acquired image is to serve as a standard image, the acquired image is written as a standard image in the DRAM 7 via the bus 61 (step SA3), and the process proceeds to a subsequent image acquisition process. The standard image written in the DRAM 7 is stored in the DRAM 7 until the successive image-acquisition process ends.

If the currently acquired image is not to serve as a standard image, the acquired image is stored as a reference image in the DRAM 7 via the bus 61 (step SA4).

Subsequently, the standard image and the reference image stored in the DRAM 7 are read by the image processor 9, and the alignment amount calculator 29 performs a misalignment-amount calculating process (step SA5). The misalignment-amount calculating process will be described in detail later.

Then, the image combining unit 31 performs geometric conversion on the reference image based on the misalignment amount calculated by the alignment amount calculator 29, and combines the converted reference image with the standard image so as to generate a combined image (step SA6).

Subsequently, the CPU 15 determines whether or not the successive image-acquisition process is completed (step SA7). In detail, the CPU 15 determines whether or not a command for stopping the successive image-acquisition process is input. The command for stopping the image acquisition process is input when, for example, the release button serving as the operable unit 17 is pressed again during the still-image acquisition process. When there is no input of a command for stopping the successive image-acquisition process, the process returns to step SA2 for acquiring a subsequent reference image. In contrast, if a command for stopping the image acquisition process is input, the process proceeds to step SA8.

Subsequently, the white-balance corrector 33, the synchronization processor 35, the brightness-characteristic converter 37, the edge enhancement processor 39, the noise-reduction processor 41, and the color reproduction processor 43 within the image processor 9 develop the combined image (step SA8).

The combined image developed in the image processor 9 is written in the DRAM 7 via the bus 61 (step SA9).

The combined image for recording written in the DRAM 7 is recorded in the flash memory 19 by the CPU 15 (step SA10). Then, the process ends.

Next, the misalignment-amount calculating process in step SA5 will be described in detail with reference to the flowchart in FIG. 7.

In the misalignment-amount calculating process, the multi-planar projection-conversion-matrix calculator 45 first calculates a projection conversion matrix for each of planes with different misalignment amounts in the reference image (step SB1). Specifically, the multi-planar projection-conversion-matrix calculator 45 first extracts feature points in an image and performs feature-point matching, so as to determine the coordinates of corresponding points between the standard image and the reference image. The corresponding points are extracted by using motion vectors using a known optical flow technique, a SIFT (scale-invariant feature transform) technique, or a SURF (speeded-up robust features) technique.

Subsequently, the multi-planar projection-conversion-matrix calculator 45 performs grouping of the corresponding points. The method of grouping the corresponding points is not limited and may involve simply grouping corresponding points with similar misalignment amounts in the coordinates of the corresponding points between the standard image and the reference image into the same group, or may involve a recursive process of first determining a projection conversion matrix in accordance with arbitrarily grouped corresponding points, subsequently projecting the actual coordinates of a corresponding point of the reference image onto the standard image, and then updating the groups to minimize an error in the coordinates.

Figure 8:
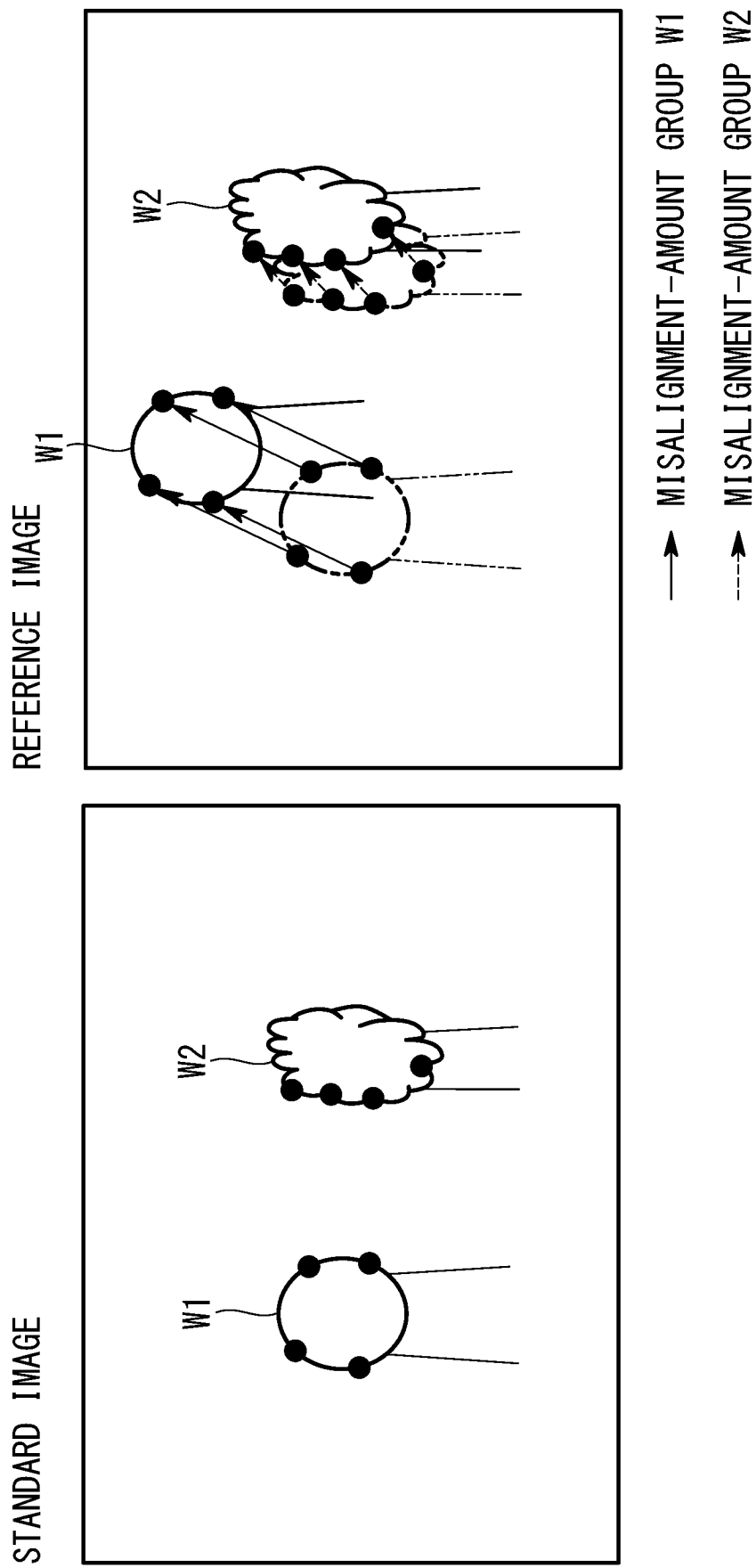
FIG. 8 explains a difference in misalignment amount according to planes and grouping according to a misalignment amount.

In this embodiment, for example, as shown in FIG. 8, the multi-planar projection-conversion-matrix calculator 45 first determines two groups W1 and W2 with different misalignment amounts and the coordinates of corresponding points belonging to the groups W1 and W2. In FIG. 8, the black dots in the groups W1 and W2 denote corresponding points.

Subsequently, the multi-planar projection-conversion-matrix calculator 45 determines a projection conversion matrix by using four corresponding points in the same group W1 and four corresponding points in the same group W2.

Since there are two groups W1 and W2 in the example shown in FIG. 8, geometric conversion functions modeled based on projection conversion matrices are determined, as indicated by expressions (3) and (4) below. Because expressions (3) and (4) indicated below are simultaneous equations with eight unknowns, expressions (3) and (4) can be solved by applying four corresponding points thereto.

$$\begin{pmatrix} x1 \\ y1 \\ 1 \end{pmatrix} = \begin{pmatrix} H1 & H2 & H3 \\ H4 & H5 & H8 \\ H7 & H6 & 1 \end{pmatrix} \begin{pmatrix} x1' \\ y1' \\ 1 \end{pmatrix} \quad (3)$$

where x1 and y1 each denote the coordinates of a corresponding point in the standard image of the misalignment-amount group W1, x2 and y2 each denote the coordinates of a corresponding point in the standard image of the misalignment-amount group W1, and H1 to H8 each denote a projection conversion matrix of the misalignment-amount group W1.

$$\begin{pmatrix} x2 \\ y2 \\ 1 \end{pmatrix} = \begin{pmatrix} G1 & G2 & G3 \\ G4 & G5 & G8 \\ G7 & G6 & 1 \end{pmatrix} \begin{pmatrix} x2' \\ y2' \\ 1 \end{pmatrix} \quad (4)$$

where x1' and y1' each denote the coordinates of a corresponding point in the reference image of the misalignment-amount group W2, x2' and y2' each denote the coordinates of a corresponding point in the reference image of the misalignment-amount group W2, and G1 to G8 each denote a projection conversion matrix of the misalignment-amount group W2.

Subsequently, the plane selector 47 performs plane selection (step SB2). In plane selection, a plurality of alignment images are generated by using all of the projection conversion matrices calculated by the multi-planar projection-conversion-matrix calculator 45.

Figure 9:
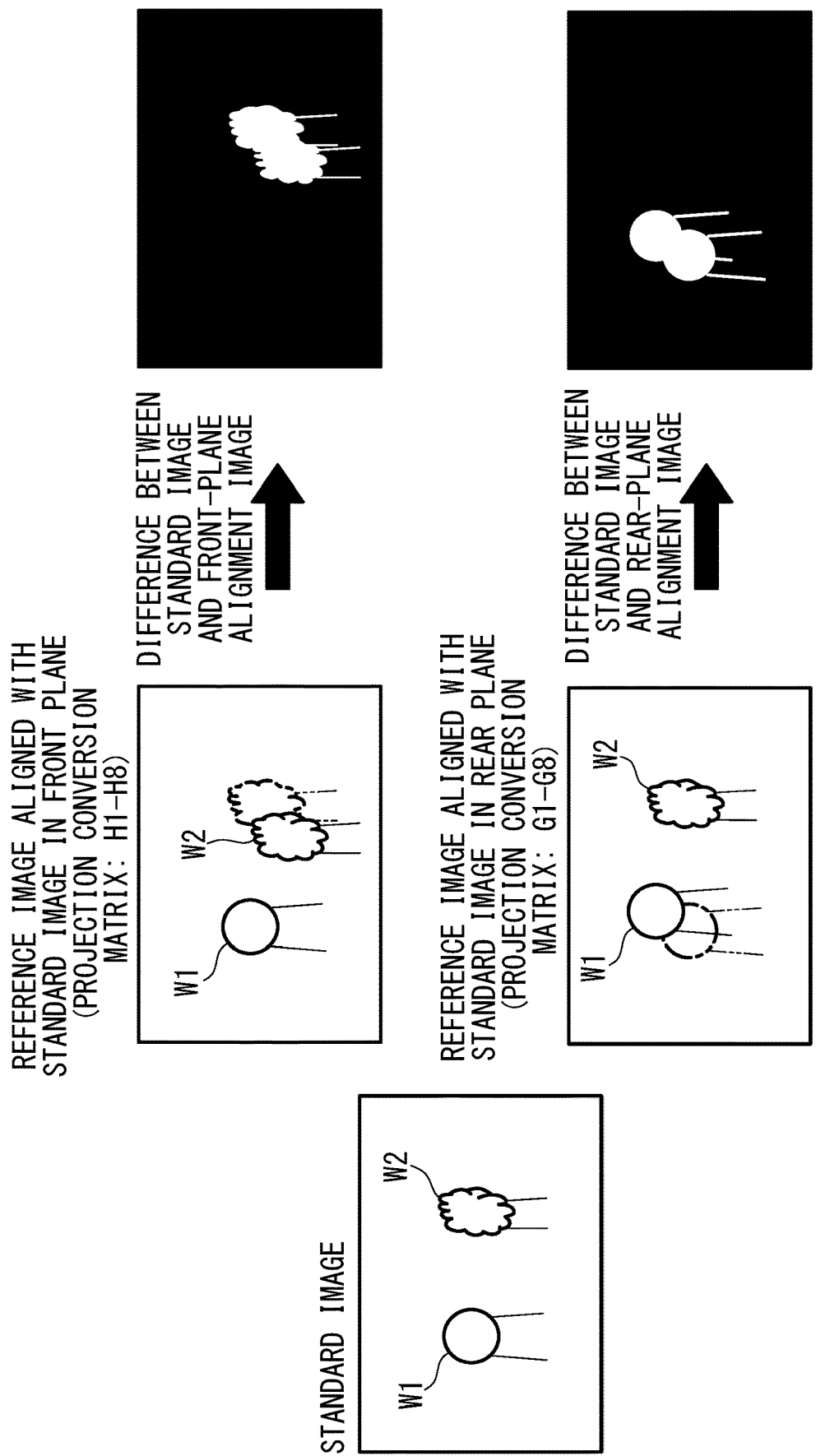
FIG. 9 explains plane selection using a difference value of an alignment image.

For example, in a case where two projection conversion matrices (H1 to H8) and (G1 to G8) are calculated, the plane selector 47 generates two alignment images, namely, an alignment image obtained by converting the reference image in accordance with the projection conversion matrix (H1 to H8) and an alignment image obtained by converting the reference image in accordance with the projection conversion matrix (G1 to G8), as shown in FIG. 9.

Then, if a plane is to be selected at a certain pixel position, the plane selector 47 compares a difference between the image obtained using the projection conversion matrix (H1 to H8) for the pixel position and the standard image and a difference between the image obtained using the projection conversion matrix (G1 to G8) and the standard image, and selects the projection conversion matrix corresponding to the image with the smaller difference value.

As shown in FIG. 9, since alignment is performed using projection conversion matrices of different planes, misalignment occurs, thus causing the difference value to increase. The above process is performed on all pixel positions, the plane to which each pixel position belongs and the projection conversion matrix to be applied are set, and the plane map, which is the selection result of each pixel position, is output. For example, if there are only two planes, the plane map is a binary image in which 0 or 1 indicates which of two projection conversion matrices (H1 to H8) and (G1 to G8) is to be applied.

Subsequently, the map reduction processor 53 reduces the plane map (step SB3). This reduction process desirably involves resizing by decimation instead of interpolation so as to prevent an additional selection error from occurring due to interpolation. Although FIG. 10 illustrates a case where an 8×8 plane map is reduced to ½, the reduction rate and the size of the map are not limited thereto.

Figure 10:
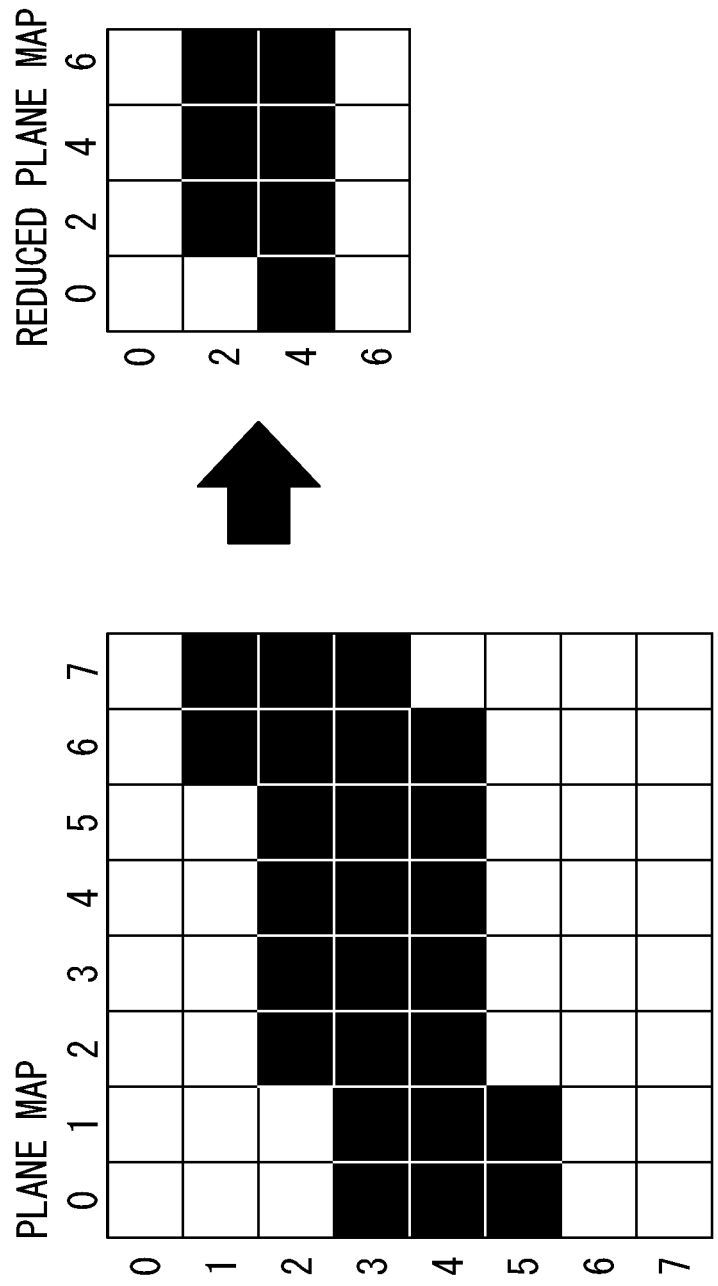
FIG. 10 explains a plane-map reducing method.

In FIG. 10, in a case where ½ decimation is performed in the horizontal and vertical directions on the 8×8 plane map, for example, the extracted pixels in the horizontal direction are only the results of even-numbered positions, and the extracted pixels in the vertical direction are also only the results of even-numbered positions, so that the size is reduced to ½ in the horizontal and vertical directions. The reduced plane map serves as an input in the subsequent process.

Subsequently, the map filter processor 55 performs a map filtering process on the reduced plane map (step SB4). The map filtering process involves applying a noise removal filter to the reduced plane map. A selection error to be suppressed in the map filtering process is a selection error caused by noise in an image.

Normally, in a case where a selection error is caused by misalignment in which the difference value between an alignment image and a standard image is large, the selection error occurs over the area of the subject in a specific subject region. On the other hand, in a case of a selection error caused by noise, there are randomly different planes, like isolated points. Therefore, a selection error that occurs randomly like isolated points where continuity is not maintained as a subject can be suppressed by a noise removal filter, such as a median filter (median filtering process).

Subsequently, the conversion-error reduction processor 57 performs a conversion-error reduction process on the plane map (step SB5). When generating an alignment image using a projection conversion matrix, the coordinates after the projection conversion are sometimes not expressed with integer accuracy. In that case, in order to generate a pixel value at an integer pixel position, such a pixel value is normally generated in accordance with weighting interpolation using surrounding pixels, such as bicubic interpolation.

Interpolation particularly affects the pixel values of edges, and by extension the difference image. For example, FIG. 11 illustrates image data sampled when the camera is rotated by 20° between a standard image and a reference image. FIG. 12 illustrates a result obtained when geometric conversion is digitally performed on a reference image using a projection conversion matrix.

In the example shown in FIG. 11, since the sampling is always performed with sectional accuracy of the image acquisition element 27, an image of a monochromatic pattern is acquired with integer accuracy. On the other hand, as shown in FIG. 12, in a case where geometric conversion is digitally performed, the decimal accuracy in calculation is expressed with, for example, a weighting mixture of surrounding pixels, and a monochromatic edge component becomes grey, which is a mixture of white and black, due to the effect of weighting interpolation. As a result, even if the motion of the camera is properly estimated, a difference occurs between the image generated in FIG. 11 and the image generated in FIG. 12. Thus, erroneous determination occurs at the edges of the plane map.

Figure 13:
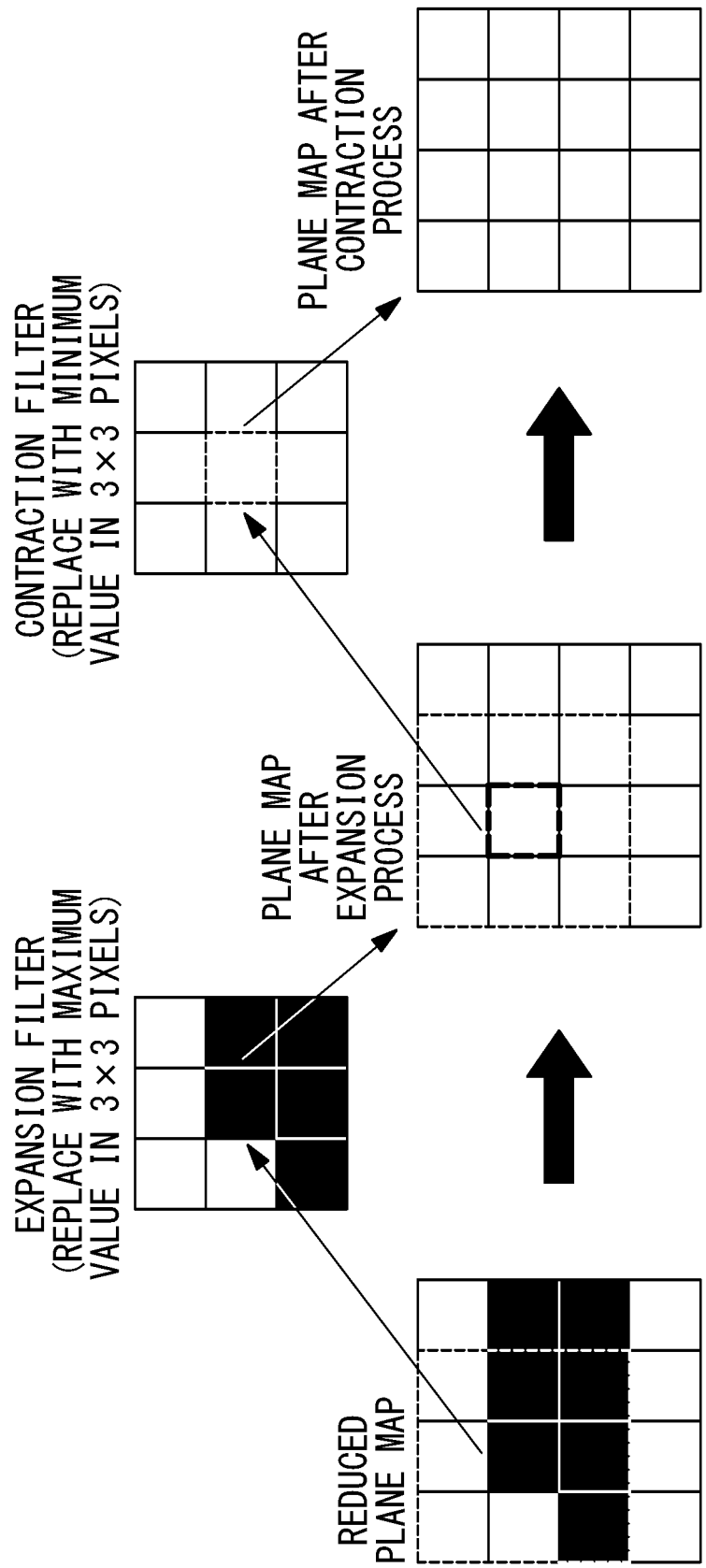
FIG. 13 explains a plane-map expansion process.

Subsequently, the conversion-error reduction processor 57 performs a conversion-error reduction process on the plane map. The conversion-error reduction process involves performing a contraction process on the plane map after performing an expansion process thereon. Thus, the selection error of the edges is removed while a proper plane selection is maintained. The plane map shown in FIG. 13 has a 0 plane, that is, a black plane, mixed therein due to erroneous determination of the edges, regardless of the fact that a proper region should be a 1 plane, that is, a white plane. In order to remove this, an expansion filter is applied.

For example, the expansion filter is used for replacing a target pixel value to be filtered with a maximum pixel value in 3×3 pixels. By applying the expansion filter, an edge or an isolation point in 1 to 2 pixels is replaced with a surrounding pixel value.

Figure 14:
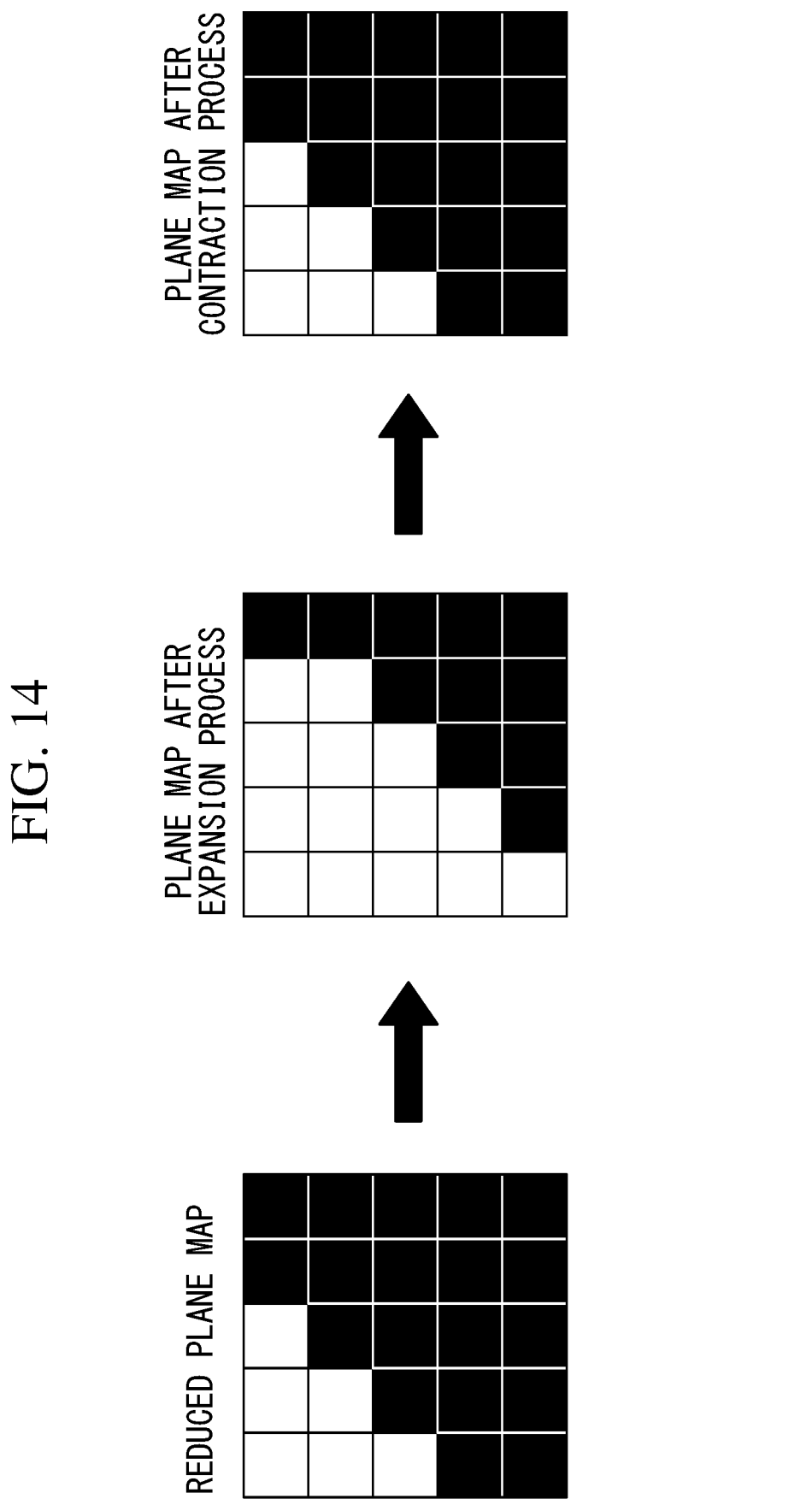
FIG. 14 explains a plane-map contraction process.

On the other hand, simply performing an expansion process would result in a deleted region in a case of a proper plane selection result shown in FIG. 14. Therefore, a contraction filtering process is performed on the plane map to which the expansion filter is subsequently applied.

For example, the contraction filter is used for replacing a target pixel value to be filtered with a minimum pixel value in 3×3 pixels. By performing the contraction process, a deleted region is restored in a plane selection result including three or more pixel regions. In contrast, the edge selection error shown in FIG. 13 remains removed. The filter size of the expansion and contraction filters is not limited to the 3×3 size, and may be changed in accordance with the intended purpose or the image size.

Subsequently, the map expansion processor 59 expands the reduced plane map (step SB6). The map expansion process involves expanding the plane map such that the resolution thereof is the same as that of the image before the reduction, that is, the standard image.

Then, the arithmetic processor 51 uses the plane selection result of each pixel position of the plane map and a projection conversion matrix linked therewith to calculate the misalignment amount of each pixel (step SB7). The calculated misalignment amount of each pixel is transmitted to the image combining unit 31. Consequently, the process returns to step SA6 in the flowchart in FIG. 6, where the image combining unit 31 converts the reference image based on the misalignment amount of each pixel from the arithmetic processor 51, whereby a combined image of the reference image and the standard image is generated.

As described above, in the image acquisition system 100 equipped with the image processor 9 according to this embodiment and the image processing method, the image combining unit 31 converts the reference image based on the plane map and eliminates misalignment between the reference image and the standard image for each planar region, whereby a combined image in which the reference image and the standard image are aligned with each other is generated.

In an image including an object having a plurality of planes so as to have depth, a selection error of a projection conversion matrix to be applied may sometimes occur due to a factor other than different planar regions, such as a difference occurring between an alignment image and the standard image. Even in that case, the selection-error reduction processor 49 suppresses a selection error of a projection conversion matrix in the plane map. Consequently, an appropriate misalignment amount can be applied to an appropriate region based on an appropriate plane map. Therefore, with regard to a subject having a mixture of a plurality of planes and thus having depth, a high-resolution combined image in which artifacts caused by misalignment are suppressed can be generated.

As an alternative to this embodiment in which the image processing method is realized by hardware, the image processing method may alternatively be realized by an image processing program executable by a computer.

Although the embodiment of the present invention has been described in detail above with reference to the drawings, specific configurations are not limited to this embodiment, and design modifications are included so long as they do not depart from the scope of the invention. For example, although a digital camera is described as an example of the image acquisition system 100 in this embodiment, the above-described technology is not limited to a digital camera and may be applied to an alternative so long as it has a plurality of pieces of image acquisition data including a standard image and a reference image.

The above-described embodiment also leads to the following invention.

A first aspect of the present invention provides an image processing apparatus including: a misalignment amount calculator that calculates a misalignment amount of each pixel of at least one reference image other than a standard image, serving as a standard in a plurality of images obtained by photographing a subject, relative to each pixel of the standard image by using a projection conversion matrix; and an image combining unit that generates a combined image by combining the reference image converted based on the misalignment amount calculated by the misalignment amount calculator with the standard image. The misalignment amount calculator includes a multi-planar projection-conversion-matrix calculator that calculates the projection conversion matrix for each of planes with different misalignment amounts in the reference image, a plane selector that generates a plurality of alignment images converted from the reference image by using the projection conversion matrices calculated for the respective planes and generates a plane map in which the plane to which each pixel of the reference image belongs and the projection conversion matrix to be applied to each plane are selected based on a difference value between each of the alignment images and the standard image, a selection-error reduction processor that suppresses a selection error of the projection conversion matrix in the plane map, and an arithmetic processor that calculates the misalignment amount for each of the planes based on the plane map in which the selection error of the projection conversion matrix is suppressed.

According to this aspect, in the misalignment amount calculator, the multi-planar projection-conversion-matrix calculator calculates a projection conversion matrix for each of planes with different misalignment amounts from the standard image in the reference image, and the plane selector generates a plurality of alignment images converted from the reference image by using the projection conversion matrices. Then, based on a difference value between each alignment image and the standard image, the plane selector generates a plane map in which the plane to which each pixel of the reference image belongs and the projection conversion matrix to be applied to each plane are selected. The arithmetic processor calculates a misalignment amount for each of the planes based on the plane map. Consequently, the image combining unit converts the reference image based on the calculated misalignment amounts so as to resolve misalignment with the standard image for each planar region, thereby generating a combined image in which the reference image and the standard image are aligned with each other.

A selection error of a projection conversion matrix to be applied may sometimes occur due to a factor other than different planar regions, such as a difference occurring between an alignment image and the standard image. In this case, the selection-error reduction processor suppresses a selection error of a projection conversion matrix in the plane map, so that an appropriate misalignment amount can be applied to an appropriate region based on an appropriate plane map. Therefore, with regard to a subject having a mixture of a plurality of planes and thus having depth, a high-resolution combined image in which artifacts caused by misalignment are suppressed can be generated.

In the above aspect, the selection-error reduction processor may include a conversion-error reduction processor that suppresses a selection error of the projection conversion matrix caused by geometric conversion using the projection conversion matrix when the plane selector generates each alignment image.

In an alignment image generated by the plane selector, a design change may sometimes occur in a high-frequency component (such as an edge) due to geometric conversion using a projection conversion matrix. This may cause the difference value between the alignment image in which the design change has occurred and the standard image to increase, resulting in a selection error in the projection conversion matrix to be applied. The conversion-error reduction processor suppresses a projection-conversion-matrix selection error caused by geometric conversion using a projection conversion matrix, so that the effect of a change in a high-frequency component caused by geometric conversion can be reduced. The arithmetic processor can then calculate an appropriate misalignment amount for each plane based on an appropriate plane map.

In the above aspect, the conversion-error reduction processor may perform a contraction process after performing an expansion process on the plane map.

According to this configuration, an erroneously selected projection conversion matrix can be corrected while a projection conversion matrix properly selected for each plane is maintained.

In the above aspect, the expansion process may include replacing a plurality of target pixels in the plane map with a maximum pixel value among the plurality of target pixels, and the reduction process may include replacing the plurality of target pixels in the plane map with a minimum pixel value among the plurality of target pixels.

According to this configuration, an edge or an isolation point in a plurality of target pixels is replaced with a surrounding pixel value by performing the expansion process, and a projection conversion matrix of a region deleted as a result of the expansion process in the region including the plurality of target pixels can be restored by performing the contraction process.

In the above aspect, the selection-error reduction processor may include a map filter processor that suppresses a selection error of the projection conversion matrix caused by noise.

When a difference between an alignment image and the standard image increases or decreases due to the effect of noise, an error may occur in the selection of a projection conversion matrix to be applied. The map filter processor suppresses a selection error of a projection conversion matrix caused by noise, so as to reduce the effect of noise. The arithmetic processor can calculate an appropriate misalignment amount for each plane based on an appropriate plane map.

In the above aspect, the map filter processor may perform a median filtering process on the plane map.

In a case of a selection error caused by noise, there are randomly different planes, like isolated points. Therefore, a selection error that occurs randomly like isolated points where continuity is not maintained as a subject can be effectively suppressed by performing the median filtering process.

In the above aspect, the selection-error reduction processor may include a map reduction processor that reduces the plane map and a map expansion processor that restores the plane map reduced by the map reduction processor back to a resolution before the reduction.

According to this configuration, a selection error of a projection conversion matrix in the plane map reduced by the map reduction processor is suppressed so that the amount of calculation for suppressing a selection error of a projection conversion matrix can be reduced by an amount by which the plane map is reduced.

In the above aspect, the map reduction processor may reduce the resolution of the plane map before the selection error of the projection conversion matrix is suppressed by the selection-error reduction processor, and the map expansion processor may increase the resolution of the plane map after the selection error of the projection conversion matrix is suppressed by the selection-error reduction processor.

According to this configuration, the amount of calculation can be effectively reduced.

A second aspect of the present invention provides an image acquisition system including an image acquisition unit that acquires a plurality of images of a subject and the image processing apparatus according to the above aspect that processes the plurality of images acquired by the image acquisition unit.

According to this aspect, with regard to a subject having a mixture of a plurality of planes and thus having depth, the image processing apparatus can still generate a high-resolution combined image in which artifacts caused by misalignment are suppressed by using the plurality of images of the subject acquired by the image acquisition unit.

A third aspect of the present invention provides an image processing method including: a misalignment-amount calculating step for calculating a misalignment amount of each pixel of at least one reference image other than a standard image, serving as a standard in a plurality of images obtained by photographing a subject, relative to each pixel of the standard image by using a projection conversion matrix; and an image combining step for generating a combined image by combining the reference image converted based on the misalignment amount calculated in the misalignment-amount calculating step with the standard image. The misalignment-amount calculating step includes a multi-planar projection-conversion-matrix calculating step for calculating the projection conversion matrix for each of planes with different misalignment amounts in the reference image, a plane selecting step for generating a plurality of alignment images converted from the reference image by using the projection conversion matrices calculated for the respective planes and generating a plane map in which the plane to which each pixel of the reference image belongs and the projection conversion matrix to be applied to each plane are selected based on a difference value between each of the alignment images and the standard image, a selection-error reducing step for suppressing a selection error of the projection conversion matrix in the plane map, and an arithmetic step for calculating the misalignment amount for each of the planes based on the plane map in which the selection error of the projection conversion matrix is suppressed.

According to this aspect, in the misalignment-amount calculating step, a projection conversion matrix is calculated in the multi-planar projection-conversion-matrix calculating step for each of planes with different misalignment amounts from the standard image in the reference image, and in the plane selecting step, a plurality of alignment images converted from the reference image while switching between the projection conversion matrices are generated. Then, in the plane selecting step, a plane map in which the plane to which each pixel of the reference image belongs and the projection conversion matrix to be applied to each plane are selected is generated based on a difference value between each alignment image and the standard image. In the arithmetic step, a misalignment amount is calculated for each of the planes based on the plane map. Consequently, in the image combining step, the reference image is converted based on the calculated misalignment amounts so that misalignment with the standard image is resolved for each planar region, whereby a combined image in which the reference image and the standard image are aligned with each other is generated.

In this case, a selection error of a projection conversion matrix is suppressed as a result of the selection-error reducing step so that an appropriate misalignment amount can be applied to an appropriate region based on an appropriate plane map. Therefore, with regard to a subject having a mixture of a plurality of planes and thus having depth, a high-resolution combined image in which artifacts caused by misalignment are suppressed can be generated.

A fourth aspect of the present invention provides an image processing program executed by a computer. The image processing program includes: a misalignment-amount calculating step for calculating a misalignment amount of each pixel of a reference image other than a standard image, serving as a standard in a plurality of images obtained by photographing a subject, relative to each pixel of the standard image by using a projection conversion matrix; and an image combining step for generating a combined image by combining the reference image converted based on the misalignment amount calculated in the misalignment-amount calculating step with the standard image. The misalignment-amount calculating step includes a multi-planar projection-conversion-matrix calculating step for calculating the projection conversion matrix for each of planes with different misalignment amounts in the reference image, a plane selecting step for generating a plurality of alignment images converted from the reference image by using the projection conversion matrices calculated for the respective planes and generating a plane map in which the plane to which each pixel of the reference image belongs and the projection conversion matrix to be applied to each plane are selected based on a difference value between each of the alignment images and the standard image, a selection-error reducing step for suppressing a selection error of the projection conversion matrix in the plane map, and an arithmetic step for calculating the misalignment amount for each of the planes based on the plane map in which the selection error of the projection conversion matrix is suppressed.

According to this aspect, the computer is caused to execute the program so that, in the misalignment-amount calculating step, a projection conversion matrix is calculated in the multi-planar projection-conversion-matrix calculating step for each of planes with different misalignment amounts in the reference image, and in the plane selecting step, a plurality of alignment images converted from the reference image while switching between the projection conversion matrices are generated. Then, in the plane selecting step, a plane map in which the plane to which each pixel of the reference image belongs and the projection conversion matrix to be applied to each plane are selected is generated based on a difference value between each alignment image and the standard image. In the arithmetic step, a misalignment amount is calculated for each of the planes based on the plane map. Consequently, in the image combining step, the reference image is converted based on the calculated misalignment amounts so that misalignment with the standard image is resolved for each planar region, whereby a combined image in which the reference image and the standard image are aligned with each other is generated.

In this case, a selection error of a projection conversion matrix is suppressed as a result of the selection-error reducing step, so that an appropriate misalignment amount can be applied to an appropriate region based on an appropriate plane map. Therefore, with regard to a subject having a mixture of a plurality of planes and thus having depth, a high-resolution combined image in which artifacts caused by misalignment are suppressed can be generated by causing the computer to execute the program.

REFERENCE SIGNS LIST 1 image acquisition unit
9 image processor (image processing apparatus)
29 alignment amount calculator (misalignment amount calculator)
31 image combining unit
45 multi-planar projection-conversion-matrix calculator
47 plane selector
49 selection-error reduction processor
51 arithmetic processor 53 map reduction processor
55 map filter processor
57 conversion-error reduction processor
59 map expansion processor
100 image acquisition system
SA5 misalignment-amount calculating step
SA6 image combining step
SB1 multi-planar projection-conversion-matrix calculating step
SB2 plane selecting step
SB3 selection-error reducing step
SB4 selection-error reducing step
SB5 selection-error reducing step
SB6 selection-error reducing step
SB7 arithmetic step

The invention claimed is:

1. An image processing apparatus comprising:
at least one processor, the processor being configured to execute processes comprising:
a misalignment amount calculating process that calculates a misalignment amount of each pixel of at least one reference image other than a standard image, serving as a standard in a plurality of images obtained by photographing a subject, relative to each pixel of the standard image by using a projection conversion matrix; and
an image combining process that generates a combined image by combining the reference image converted based on misalignment amounts calculated by the misalignment amount calculating process with the standard image,
wherein the misalignment amount calculating process includes:
a multi-planar projection-conversion-matrix calculating process that calculates the projection conversion matrix for each of planes with different misalignment amounts in the reference image;
a plane selecting process that generates a plurality of alignment images converted from the reference image by using the projection conversion matrices calculated for the respective planes and generates a plane map in which the plane to which each pixel of the reference image belongs and the projection conversion matrix to be applied to each plane are selected based on a difference value between each of the alignment images and the standard image;
a selection-error reduction process that suppresses a selection error of the projection conversion matrix in the plane map; and
an arithmetic process that calculates the misalignment amount for each of the planes based on the plane map in which the selection error of the projection conversion matrix is suppressed,
wherein the selection-error reduction process includes a conversion-error reduction process that suppresses a selection error of the projection conversion matrix caused by geometric conversion using the projection conversion matrix when the plane selecting process generates each alignment image, and
wherein the conversion-error reduction process performs a contraction process after performing an expansion process on the plane map.

2. The image processing apparatus according to claim 1, wherein the expansion process includes replacing a plurality of target pixels in the plane map with a maximum pixel value among the plurality of target pixels, and the reduction process includes replacing the plurality of target pixels in the plane map with a minimum pixel value among the plurality of target pixels.

3. The image processing apparatus according to claim 2, wherein the selection-error reduction process includes a map filter process that suppresses a selection error of the projection conversion matrix caused by noise.

4. The image processing apparatus according to claim 3, wherein the map filter process performs a median filtering on the plane map.

5. The image processing apparatus according to claim 1, wherein the selection-error reduction process includes:
a map reduction process that reduces the plane map; and
a map expansion process that restores the plane map reduced by the map reduction process back to a resolution of the plane map before the reduction.

6. The image processing apparatus according to claim 5, wherein the map reduction process reduces the resolution of the plane map before the selection error of the projection conversion matrix is suppressed by the selection-error reduction process, and
wherein the map expansion process increases the resolution of the plane map after the selection error of the projection conversion matrix is suppressed by the selection-error reduction process.

7. An image acquisition system comprising:
an image acquisition unit configured to acquire a plurality of images of a subject; and
the image processing apparatus according to claim 6 that processes the plurality of images acquired by the image acquisition unit.

8. An image processing method comprising:
calculating a misalignment amount of each pixel of at least one reference image other than a standard image, serving as a standard in a plurality of images obtained by photographing a subject, relative to each pixel of the standard image by using a projection conversion matrix; and
generating a combined image by combining the reference image converted based on misalignment amounts calculated in the calculating of the misalignment amounts with the standard image,
wherein the calculating of the misalignment amounts includes:
calculating the projection conversion matrix for each of planes with different misalignment amounts in the reference image;
generating a plurality of alignment images converted from the reference image by using the projection conversion matrices calculated for the respective planes and generating a plane map in which the plane to which each pixel of the reference image belongs and the projection conversion matrix to be applied to each plane are selected based on a difference value between each of the alignment images and the standard image;
suppressing a selection error of the projection conversion matrix in the plane map; and
calculating the misalignment amount for each of the planes based on the plane map in which the selection error of the projection conversion matrix is suppressed,
wherein the suppressing of the selection error of the projection conversion matrix includes suppressing a selection error of the projection conversion matrix caused by geometric conversion using the projection conversion matrix when generating each alignment image, and wherein the suppressing of the selection error of the projection conversion matrix caused by geometric conversion using the projection conversion matrix includes performing a contraction process after performing an expansion process on the plane map.

9. A non-transitory computer-readable medium having an image processing program stored therein, the image processing program being executable by a computer to control the computer to execute functions comprising:

calculating a misalignment amount of each pixel of a reference image other than a standard image, serving as a standard in a plurality of images obtained by photographing a subject, relative to each pixel of the standard image by using a projection conversion matrix; and generating a combined image by combining the reference image converted based on misalignment amounts calculated in the calculating of the misalignment amounts with the standard image, wherein the calculating of the misalignment amounts includes:

calculating the projection conversion matrix for each of planes with different misalignment amounts in the reference image;

generating a plurality of alignment images converted from the reference image by using the projection conversion matrices calculated for the respective planes and generating a plane map in which the plane to which each pixel of the reference image belongs and the projection conversion matrix to be applied to each plane are selected based on a difference value between each of the alignment images and the standard image;

suppressing a selection error of the projection conversion matrix in the plane map; and calculating the misalignment amount for each of the planes based on the plane map in which the selection error of the projection conversion matrix is suppressed, wherein the suppressing of the selection error of the projection conversion matrix includes suppressing a selection error of the projection conversion matrix caused by geometric conversion using the projection conversion matrix when generating each alignment image, and wherein the suppressing of the selection error of the projection conversion matrix caused by geometric conversion using the projection conversion matrix includes performing a contraction process after performing an expansion process on the plane map.

\* \* \* \* \*